United States Patent [19]

Carandang et al.

[11] Patent Number: 4,737,195
[45] Date of Patent: Apr. 12, 1988

[54] ACTIVATOR-ACCELERATOR MIXTURES FOR ALKALINE PAINT STRIPPER COMPOSITIONS

[75] Inventors: Carmen M. Carandang, Oaks; Robert W. Koch, Norristown, both of Pa.

[73] Assignee: Amchem Products, Ambler, Pa.

[21] Appl. No.: 847,398

[22] Filed: Apr. 1, 1986

Related U.S. Application Data

[63] Continuation-in-part of Ser. No. 553,337, Nov. 18, 1983, abandoned.

[51] Int. Cl.$^4$ .......................... C09D 9/00; C11D 7/06; C11D 7/52; C23D 17/00
[52] U.S. Cl. ...................................... 134/38; 252/153; 252/156; 252/158; 252/170; 252/171; 252/174.21; 252/174.22; 252/542; 252/544; 252/548; 252/DIG. 8
[58] Field of Search .................. 134/38; 252/153, 156, 252/158, 174.21, 174.22, 544, 548, DIG. 8, 524, 542

[56] References Cited

U.S. PATENT DOCUMENTS

| | | | |
|---|---|---|---|
| 2,971,919 | 2/1961 | Goldsmith | 252/139 |
| 3,058,918 | 10/1962 | Gatza | 252/139 |
| 3,335,092 | 8/1967 | Perry | 252/158 |
| 3,551,204 | 11/1970 | Bolger | 134/2 |
| 3,615,825 | 10/1971 | Gansser | 134/38 |
| 3,673,099 | 6/1972 | Corby | 252/156 |
| 3,766,076 | 10/1973 | Murphy | 252/156 |
| 3,839,234 | 10/1974 | Roscoe | 252/544 |
| 3,847,839 | 11/1974 | Murphy | 252/544 |
| 3,954,648 | 5/1976 | Belcak | 252/158 |
| 3,972,839 | 8/1976 | Murphy | 252/548 |
| 4,085,059 | 4/1978 | Smith | 252/118 |
| 4,276,186 | 6/1981 | Bakos | 252/118 |
| 4,366,002 | 12/1982 | Carandang | 134/2 |
| 4,401,748 | 8/1983 | Ward | 430/258 |
| 4,428,871 | 1/1984 | Ward | 252/542 |
| 4,617,251 | 10/1986 | Sizensky | 430/256 |
| 4,619,706 | 10/1986 | Squires | 134/2 |

OTHER PUBLICATIONS

Miranol Amphoteric Imidazoline Derivatives; Technical and Product Development Data, 8th Edition, pp. 1, 3, 57.

Primary Examiner—Dennis Albrecht
Attorney, Agent, or Firm—Ernest G. Szoke; Henry E. Millson, Jr.

[57] ABSTRACT

An activator composition having increased effectiveness and life when used in an aqueous alkaline stripper solution at elevated temperatures to remove siccative coatings from substrates containing two essential components A and B. Component A consists essentially of at least one of an ethoxylated tetrahydrofurfuryl, a mixture of an ethoxylated tetrahydrofurfuryl and an ethoxylated furfuryl, N-methyl-2-pyrrolidone and N-(2-hydroxyethyl)-2-pyrrolidine. Component B consists essentially of at least one of N-phenyl-diethanolamine, furfurylamine, tetrahydrofurfurylamine, octadecylamine, butoxypropanolamine and N-amino-morpholine.

23 Claims, No Drawings

ACTIVATOR-ACCELERATOR MIXTURES FOR ALKALINE PAINT STRIPPER COMPOSITIONS

This application is a continuation-in-part of Applicants' copending application Ser. No. 553,337, filed Nov. 18, 1983, now abandoned, the disclosure of which is incorporated herein in its entirety by reference thereto.

FIELD OF THE INVENTION

This invention relates to stripper compositions for removing siccative coatings. The invention particularly relates to stable, non-volatile aqueous alkaline stripping compositions for removing siccative coatings such as paint, shellac, varnish, lacquer and the like from wood and metal substrates. This invention more particularly relates to activator compositions for addition to alkaline stripper solutions for use in the removal of siccative coatings from metal substrates to obtain clean and strain free substrate surfaces.

BACKGROUND OF THE INVENTION

Compositions which are effective in removing siccative coatings from a wide variety of substrates, including wood and metals, are known. They find utility in such diverse operations as furniture stripping and similar applications which may be characterized as home restoration operations, as well as in industrial applications, such as in the automotive industry, when it becomes necessary to remove protective siccative coatings from the component metallic parts.

The simplest of the stripping compositions comprises an aqueous alkaline solution which is usually employed at high temperature (usually a rolling boil). This is a relatively slow process in which the alkaline base is consumed and contaminants are formed in the composition.

An improvement over the use of simple solutions of alkaline bases at higher temperatures has been obtained by adding to the alkaline solution a wetting agent which accelerates the stripping operation by penetrating or permeating the paint films. Additional improvements can be realized by the use of detergents and emulsifiers which further accelerate the stripping process.

Although the aforementioned aqueous alkaline compositions, which contain wetting agents, detergents and emulsifiers and are employed at elevated temperatures and are often characterized as "hot stripper compositions", are generally effective in removing most siccative finishes, they are ineffective in removing cathodic electrodeposition paints and are not particularly effective in removing certain paints such as acrylic and vinyl paints.

It has previously been found that the addition of furfuryl alcohol, tetrahydrofurfuryl alcohol, mixtures of said alcohols, and alkoxylated furfuryl alcohol to such hot stripper compositions results in compositions that are effective in removing acrylic and vinyl paints as well as cathodic electrodeposition paints.

However, problems were encountered in the use of such stripping compositions. For example, furfuryl alcohol and water form an azeotrope, the boiling point of which falls within the operative temperature range for the hot stripper compositions. Thus, with continued use, the activator, i.e. the furfuryl alcohol, is lost as it is boiled off, thus requiring either the preparation of a new bath or the continued replacement of the furfuryl alcohol and water.

An improved activator composition is described in Applicants' prior U.S. Pat. No. 4,366,002 (the '002 patent). The '002 patent describes an activator composition comprising at least two of the following three materials:
tetrahydrofurfuryl alcohol,
$R-O(CH_2CH_2O)_nH$, wherein
R is furfuryl, or
R is tetrahydrofurfuryl,
and n in each instance has a value of from about 0.5 to 10.

It was found that the addition of two of the three above mentioned furfuryl compounds to an aqueous alkaline stripping bath provided compositions having increased stripping effectiveness and prolonged life when used at elevated temperatures.

The '002 patent compositions contained sequestering agents, surfactant or wetting agents, and composition-stabilizing or emulsifying agents.

Examples of these improved activator compositions and their method of use are disclosed in the '002 patent, and the disclosure of the '002 patent is incorporated herein in its entirety by reference thereto.

The compositions described in the '002 patent have eliminated the azeotrope problem inherent in the use of furfuryl alcohol and are effective in the stripping of alkyd, acrylic and cathodic electrodeposited paints. However, these compositions do not retain their activity as long as desired since the activator composition degrades at the elevated temperatures at which the stripping takes place. This requires either the replenishment of the activating composition in the alkaline stripper or the discarding of the entire stripper composition and the preparation of a new batch.

BRIEF DISCUSSION OF THE INVENTION

In accordance with the present invention an improved activating composition for addition to aqueous alkaline stripping solution has been prepared. The present activating composition contains two essential components. The first essential component (A) is an activator which functions as a solvent and a carrier for the second component (B) which is an amine accelerator. The activator acts to penetrate and dissolve the coating and the amine accelerator acts to accelerate the removal of the coating from the substrate.

In accordance with the present invention one or more of sequestering agents, surfactants or wetting agents, stabilizing or emulsifying agents and coupling agents can be added to the activating composition.

Alternatively these additives can be added directly to the aqueous alkaline stripper solution. Preferably the additives are added to the activating composition containing the activator and the amine accelerator.

DETAILED DESCRIPTION OF THE INVENTION

The present invention provides additional improvements in activator compositions.

The present invention particularly provides an activating composition to be added to an alkaline stripping solution, which activating composition will not be degraded and will retain its full activity after weeks of continued use under the conditions of hot stripping siccative coatings.

In a preferred embodiment of the present invention activating compositions are provided that when added to alkaline stripping solutions and used to strip coatings from metal substrates remove substantially 100% of the coating and obtain a clean and stain free surface. It was unexpectedly and surprisingly found that the addition of N-methyl-2-pyrrolidone and/or N-(2-hydroxyethyl)-2-pyrrolidone to the activating compositions of the present invention resulted in obtaining clean and stain free surfaces.

In accordance with the present invention there is provided an aqueous activating composition to be added to an aqueous alkaline solution for the removal of siccative coatings at elevated temperatures. This activating composition contains effective amounts of the following two essential components (A) and (B).

COMPONENT (A) Activators

Component (A) consists essentially of at least one of the following constituents.

(i) An ethoxylated compound of the formula $$R'O(CH_2CH_2O)_nH$$

wherein R' is tetrahydrofurfuryl and n is about 0.5 to about 10, preferably about 3 to 8.

(ii) A mixture of the ethoxylated compound (i) above, namely $$R'O(CH_2CH_2O)_nH$$

wherein R' is tetrahydrofurfuryl and n is about 0.5 to about 10, preferably about 3 to 8, and an ethoxylated compound of the formula $R''O(CH_2CH_2O)_nH$ wherein R'' furfuryl and n is about 0.5 to about 10, preferably about 0.5 to about 1.5, and more preferably about 0.85 to about 1.08.

(iii) N-methyl-2-pyrrolidone.
(iv) N-(2-hydroxyethyl)-2-pyrrolidone.

COMPONENT (B) AMINE ACCELERATORS

Component (B) consists essentially of at least one of the following constituents.
(i) N-phenyl-diethanolamine
(ii) Furfurylamine
(iii) Tetrahydrofurfurylamine
(iv) Octadecylamine
(v) Butoxypropanolamine
(vi) N-amino-morpholine A particularly preferred embodiment of the present invention consists essentially of

COMPONENT (A) ACTIVATORS (ii) A mixture of $R'O(CH_2CH_2O)_nH$ and $R''O(CH_2CH_2O)_nH$, and at least one of
(iii) N-methyl-2-pyrrolidone, or
(iv) N-(2-hydroxyethyl)-2-pyrrolidone, and

COMPONENT (B) AMINE ACCELERATORS at least one of
(i) N-phenyldiethanolamine
(ii) Furfurylamine
(iii) Tetrahydrofurfurylamine It was surprisingly and unexpectedly found that the above preferred embodiment activating composition when used in an aged aqueous alkaline stripper solution obtained 100% clean and stain free metal surfaces.

In the Component A activators, i.e. the ethoxylated tetrahydrofurfuryl and ethoxylated furfuryl, n represents the number of moles of ethylene oxide per mole of tetrahydrofurfuryl alcohol and furfuryl alcohol (reacted and unreacted) in the reaction product of ethylene oxide and either tetrahydrofurfuryl alcohol or furfuryl alcohol, i.e. n represents the average degree of ethoxylation. For example, when n is one, a mixture containing predominantly monoethoxylated furfuryl or tetrahydrofurfuryl with small quantities of the unreacted furfuryl or tetrahydrofurfuryl alcohol and small quantities of the corresponding polyethoxylated alcohols will be present. When n is a fraction less than one, relatively larger quantities of unreacted tetrahydrofurfuryl alcohol or furfuryl alcohol will be present in the mixture. When n is greater than one, relatively larger quantities of polyethoxylated tetrahydrofurfuryl of polyethoxylated furfuryl will be present.

Further, there may optionally be added to the activating composition small amounts of tetrahydrofurfuryl alcohol.

There may also optionally be added to the activating composition small amounts of di-isopropanolamine or tri-isopropanolamine, or a mixture of di-isopropanolamine and tri-isopropanolamine.

Preferably the improved activating compositions of the present invention contain one or more of a sequestering agent, a surfactant or wetting agent, a stabilizing or emulsifying agent and a coupling agent.

The sequestering agents act to tie up magnesium and calcium ions present in hard water. Representative of sequestering agents which can be employed in these compositions are hydroxy-carboxylic acids such as gluconic, citric, and tartaric acids, aminopolycarboxylic acids such as ethylene-diaminetetraacetic acid, and various commercial preparations such as Belzak AC or Glucoquest A/C, which is sodium alpha-glucoheptonate dihydrate. The Glucoquest A/C is preferred.

The surfactant or wetting agent acts to increase the efficiency of wetting the surface being treated with the activating composition. The surfactant or wetting agent used is not particularly critical so long as it does not adversely effect or interfere with the other components of the composition. Amphoteric, nonionic and/or anionic surfactants can be used. The preferred surfactants are Mirawet B (sodium butoxyethoxy acetate), provided by Miranol Chemical Co. Miranol JEM concentrate di-and-mono-carboxylate derivatives of caprylic acid and ethylhexoic acid) also provided by Miranol Chemical Co. and Sulfonate OA-5 (sodium salt of sulfonated oleic acid) manufactured by Cities Service Co. The particularly preferred surfactant is to Mirawet B (sodium butoxyethoxy acetate).

The stabilizing or emulsifying agents may be regarded as acting as a secondary solvent. The stabilizing or emulsifying agents are miscible with water and function to provide a more stable solution or emulsion which does not separate on standing. Preferred composition-stabilizing compounds included methanol, monoethanolamine, thiodiethylene glycol (provided by Alcolac Co.), diethylene glycol, tetraethylene glycol, propylene glycol, dipropylene glycol, n-butylamine and mixtures thereof. The thiodiethylene glycol and tetraethylene glycol are particularly preferred.

The coupling agents function in the activator composition as a stabilizing agent. A suitable coupling agent is butyl carbitol.

In the actual practice of using the improved activating compositions of the present invention, aqueous solutions of the activating compositions are first prepared, and when needed such activating compositions are added to an alkaline stripper solution having a pH of about 9.5 to about 14. Suitable basis for preparing these alkaline solutions are the alkaline hydroxides such as sodium and potassium hydroxides, with potassium hydroxide being preferred because of its better solubility properties.

In accordance with a preferred embodiment of the present invention there is provided an aqueous activating composition to be added to an aqueous alkaline stripper solution for the removal of siccative coatings from metal substrates at elevated temperatures. This activating composition contains effective amounts of the following ingredients. The percentages of the below ingredients are given in weight percent based on the entire weight of the activator composition.

COMPONENT A ACTIVATORS

Component (A) consists essentially of at least one of the following constituents.

1. $R'O(CH_2CH_2O)_nH$ wherein $R'$ is tetrahydrofurfuryl and n is about 0.5 to about 10, preferably about 3 to 8, in an amount of about 0.1 to 20%, e.g. 0.1 to 10%, preferably about 3 to 15% and more preferably about 3 to 10%.

2. A mixture of $R'O(CH_2CH_2O)_nH$ and $R''O(CH_2CH_2O)_nH$.

$R'O(CH_2CH_2O)_nH$ wherein $R'$ is tetrahydrofurfuryl and n is about 0.5 to about 10, preferably about 3 to 8, in an amount of about 0.1 to 20%, e.g. 0.1 to 10%, preferably about 3 to 15% and more preferably about 3 to 10%.

$R''O(CH_2CH_2O)_nH$ wherein $R''$ is furfuryl and n is about 0.5 to about 10, preferably about 0.5 to about 1.5, and more preferably about 0.85 to about 1.08, in an amount of about 0.1 to 20%, e.g. 0.1 to 10%, preferably about 3 to 15% and more preferably about 3 to 12%.

3. N-methyl-2-pyrrolidone in an amount of about 0.1 to 20%, preferably 3 to 15% and more preferably about 3 to 10%.

4. N-(2-hydroxyethyl)-2-pyrrolidone in an amount of about 0.1 to 20%, preferably about 3 to 15% and more preferably about 3 to 10%.

COMPONENT B AMINE ACCELERATORS

Component (B) consists essentially of at least one of the following constituents.

1. N-phenyl-diethanolamine in an amount of about 0.1 to 20%, e.g. 0.1 to 10%, preferably about 2 to 15%, and more preferably about 4 to 8%.

2. Furfurylamine in an amount of about 0.1 to 20%, preferably about 2 to 15%, and more preferably about 4 to 8%.

3. Tetrahydrofurfurylamine in an amount of about 0.1 to 20%, preferably about 2 to 15%, and more preferably about 4 to 8%.

4. Octadecylamine in an amount of about 0.1 to 20%, preferably about 2 to 15%, and more preferably about 4 to 8%.

5. Butoxypropanolamine in an amount of about 0.1 to 20%, preferably about 2 to 15%, and more preferably about 4 to 8%.

6. N-amino-morpholine in an amount of about 0.1 to 20%, preferably about 2 to 15%, and more preferably about 4 to 8%.

OPTIONAL INGREDIENTS

Tetrahydrofurfuryl alcohol in an amount of 0 to 20%, e.g. 0.1 to 10%, preferably about 3 to 15% and more preferably about 3 to 10%.

Disopropanolamine in an amount of about 0 to 20%, e.g. 0.1 to 10%, preferably in an amount of about 2 to 15% and more preferably in an amount of about 4 to 8%.

Trisoproponolamine in an amount of about 0 to 20%, e.g. 0.1 to 10%, preferably in an amount of about 2 to 15%, and more preferably in an amount of about 4 to 8%.

A mixture of disopropanolamine and trisopropanolamine in an amount of about 0 to 20%, e.g. 0.1 to 10%, preferably in an amount of about 2 to 15% and more preferably in an amount of about 4 to 8%. A preferred ratio of the di- and tri-isopropanolamine is from about 76% to about 98% by weight of di-isopropanolamine and from about 0.5 to about 12% by weight of triisopropanolamine.

ADDITIONAL INGREDIENTS

Sequestering agent, e.g. Glucoquest (AC) (sodium alpha-glucoheptonate dihydrate), in an amount of about 0.1 to 20%, preferably 2 to 15%, and more preferably 2 to 10%.

Surface Active agent, e.g. Mirawet B (sodium butoxyethoxy acetate), in an amount of about 0.1 to 10%, preferably 1 to 10%, more preferably 1 to 5%.

Stabilizing agent, e.g. thiodiethylene glycol and/or tetraethylene glycol, each in an amount of about 0.1 to 10%, preferably 2 to 12%, and more preferably 4 to 6%.

Coupling agent, e.g. butyl Carbitol in an amount of about 0.1 to 10%, preferably 2 to 8%, more preferably 4 to 6%.

In an embodiment of the present invention an activating composition contains the following ingredients in percent by weight of entire activating composition.

$R'O(CH_2CH_2O)_nH$ wherein $R'$ is tetrahydrofurfuryl and n is about 3 to 8, in an amount of about 3 to 10%.

$R''O(CH_2CH_2O)_nH$ wherein $R''$ is furfuryl and n is about 0.85 to about 1.08, in an amount of about 3 to 12%.

N-phenyl-dicthanolamine in an amount of about 4 to Sequestering agent, e.g. Glucoquest A/C (sodium alpha glucopheptonate dihydrate), in an amount of about 2 to 10%.

Surface active agent, e.g. Miranol JEM Conc. (sodium salts of a mixture of caprylic acid) and ethylhexoic acid in an amount of about 1 to 5%.

Stabilizing agent, e.g. tetraethylene glycol, in an amount of about 2 to 12%.

Coupling agent, e.g. butyl carbitol, in an amount of about 2 to 8%.

Water to make up the balance of the activating composition.

In another embodiment of the present invention an activating composition contains the following ingredients in percent by weight of the entire activating composition.

$R'O(CH_2CH_2O)_nH$ wherein $R'$ is tetrahydrofurfuryl and n is about 3 to about 8, in an amount of about 3 to 10%.

$R''(CH_2CH_2O)_nH$ wherein $R''$ is furfuryl and n is about 0.85 to about 1.08, in an amount of about 3 to 12%.

N-methyl-2-pyrrolidone in an amount of about 3 to 10%, and/or N-(2-hydroxyethyl)-2-pyrrolidine in an amount of about 3 to 10%.

At least one of the following amine accelerators:

N-phenyl-diethanol amine in an amount of about 4 to 8%.

Furfuryl amine in an amount of about 4 to 8%.

Tetrahydrofurfurylamine in an amount of about 4 to 8%.

Sequestering agent, e.g. Glucoquest A/C (sodium alpha glucoheptonate dihydrate) in an amount of 2 to 10%.

Surface active agent, e.g. Mirawet B (sodium butoxyacetate) in an amount of about 1 to 5%.

Stabilizing agent, e.g. thiodiethylene glycol and/or tetraethylene glycol each in an amount of about 2 to 12%.

Water to make up the balance of the activating composition.

The invention of the activator compositions will become clearer from the examples which follow.

EXAMPLE 1

An activator composition in accordance with the present invention is prepared by heating water to a temperature of about 120°-130° F. and adding to the water with stirring the following materials in the order listed.

Butyl Carbitol
N-phenyl-diethanolamine
Mixture of di- and tri-isopropanolamine
Glucoquest AC
$R''O(CH_2CH_2O)_nH$
  $R''$ is furfuryl, n is about 0.85 to about 1.08
$R'O(CH_2CH_2O)_nH$
  $R'$ is tetrahydrofurfuryl, n is about 3 to about 8.
Tetrahydrofurfuryl alcohol
Miranol JEM Conc. (di-and mono-carboxylate derivatives of caprylic and ethylhexoic acids)
Tetraethylene glycol The stirring is continued until the solution is clear. After the solution has cooled to below 90° F., it is then placed in drums or other containers until ready for use.

Following the above procedure formulations 1 to 5 were prepared, see Table 1 below.

TABLE 1

| Material | Formulations | | | | |
|---|---|---|---|---|---|
|  | 1 | 2 | 3 | 4 | 5 |
| Water | 60 | 50 | 65 | 45 | 55 |
| $R'O(CH_2CH_2O)_nH$ $R'$ = tetrahydrofurfuryl n = 3 to 8 | 3 | 5 | 3 | 6 | 5 |
| $R''O(CH_2CH_2O)_nH$ $R''$ = furfuryl n = 0.85 to 1.08 | 8 | 10 | 7 | 12 | 10 |
| Tetrahydrofurfuryl alcohol | 3 | 5 | 3 | 5 | 4 |
| N—phenyl-diethanolamine | 4 | 6 | 4 | 7 | 5 |
| Mixture of di and tri-iso-propanolamine | 5 | 6 | 4 | 7 | 6 |
| Glucoquest AC[1] | 5 | 6 | 4 | 5 | 4 |
| Miranol JEM Conc.[2] | 1 | 1 | 1 | 2 | 2 |
| Tetraethylene glycol[3] | 5 | 6 | 4 | 5 | 5 |
| Butyl carbitol[4] | 6 | 6 | 5 | 6 | 4 |

[1]Sequestering agent which is sodium alphaglucoheptonate dihydrate.
[2]Surfactant which is di- and mono-carboxylate derivatives of caprylic and ehtylhexoic acids.
[3]Stabilizing agent
[4]Coupling agent In using the aqueous activating compositions of this invention, about 2 to about 5 volumes of the activating compositions were added to about 10 volumes of an aqueous alkaline solution having a pH of about 9.5 to about 14 and containing about 10 to about 50% by weight, the higher percentages around 50% being preferred, of an alkali hydroxide. Suitable alkali hydroxides are sodium hydroxide, potassium hydroxide and mixtures thereof. While other alkali hydroxides may be used they are too expensive for heavy commercial use.

The aqueous alkaline activated stripping compositions are very effective, the compositions containing more activating composition being more effective; i.e. causing more rapid stripping.

The panels tested were Zn phosphate treated 1"×4" steel panels coated with 1.3 mils of Sherwin-Williams black cathodic paint.

The times needed to effect 100% stripping at 200° F. with different v/v percentages of the activating Formulation 1 composition of EXAMPLE 1 and a 50% sodium hydroxide solution are as follows:

| v/v Concentration | 100% Stripping Time |
|---|---|
| 0% | 25 min. |
| 5% | 10.5 min |
| 10% | 5.5 min |
| 20% | 2.5 min. |

Activating products now on the market require about 4 to 5 times as long to effect 100% stripping under similar conditions.

The aqueous alkaline activated stripping compositions positions retain their activity during use for significantly longer periods of time than those currently on the market.

EXAMPLE 2

An activator composition in accordance with a preferred embodiment of the present invention is prepared by heating water to a temperature of about 120°-130° F. and adding to the water with stirring the following materials, as applicable, in the order listed:

Thiodiethylene glycol
Furfuryl amine
Glucoquest AC
$R''O(CH_2CH_2O)_nH$
  $R''$ is furfuryl, n is about 0.85 to about 1.08.
$R'O(CH_2CH_2O)_nH$
  $R'$ is tetrahydrofurfuryl,
  n is about 3 to about 8
N-methyl-2-pyrollidine
Mirawet B
Tetraethylene glycol
Tetrahydrofurfurylamine
N-phenyl-diethanolamine The stirring is continued until the solution is clear. After the solution has cooled to below 90° F., it is then placed in drums or other containers until ready for use.

Following the above procedure the formulations 6 to 13 were prepared, see Table 2 below.

TABLE 2

| Material | Formulations | | | | | | | |
|---|---|---|---|---|---|---|---|---|
|  | 6 | 7 | 8 | 9 | 10 | 11 | 12 | 13 |
| Water | 61 | 61 | 50 | 50 | 57 | 61 | 61 | 61 |
| $R'O(CH_2CH_2O)_nH$ $R'$ = tetrahydrofurfuryl n = 3 to 8 | 5 | 5 | 5 | 5 | 5 | 15 | — | — |
| $R''O(CH_2CH_2O)_nH$ $R''$ = furfuryl | 10 | 10 | 10 | 10 | 10 | — | — | — |

TABLE 2-continued

| Material | Formulations | | | | | | | |
|---|---|---|---|---|---|---|---|---|
| | 6 | 7 | 8 | 9 | 10 | 11 | 12 | 13 |
| n = 0.85 to 1.08 | | | | | | | | |
| N—methyl-2-pyrollidone | — | — | 5 | 5 | 5 | — | 15 | 15 |
| N—phenyl-diethanolamine | — | — | — | 6 | 5 | 6 | 6 | — |
| Furfurylamine | 6 | — | 6 | 6 | — | — | — | — |
| Tetrahydrofurfurylamine | — | 6 | 6 | — | — | — | — | 6 |
| Glucoquest AC[1] | 5 | 5 | 5 | 5 | 5 | 5 | 5 | 5 |
| Mirawet B[2] | 2 | 2 | 2 | 2 | 2 | 2 | 2 | 2 |
| Tetraethylene glycol[3] | 5 | 5 | 5 | 5 | 5 | 5 | 5 | 5 |
| Thiodiethylene glycol[4] | 6 | 6 | 6 | 6 | 6 | 6 | 6 | 6 |

[1]Sequestering agent which is sodium alphaglucoheptonate dihydrate.
[2]Surfactant which is sodium butoxyethoxy acetate.
[3]Stabilizing agent
[4]Stabilizing agent

EXAMPLE 3

In order to determine the cleaning efficiency of the activating formulations 1 to 13 of Examples 1 and 2, some of the formulation were used to strip 1".×4" steel panels. The panels were coated with Celanese black electrocoat (CED) undercoat and Celanese solvent based white acrylic topcoat.

In using the activating compositions about 25% by volume of the formulation being tested was added to 40% by volume of a 45% potassium hydroxide solution and made up to 100% by volume with water.

The formulations were tested in a fresh bath and in an aged bath. The stripping bath temperature for the fresh and aged baths was 210° to 220° F.

The fresh bath tests were carried out using a 100 ml samples of the fresh alkaline baths.

The aged bath tests were carried out using 100 ml samples of alkaline baths (containing 10 grams of the powdered paint) which had been boiled for 3 hours.

In the fresh bath and aged bath tests, the time to strip 100% of the paint from the coated panels and the appearance of the cleaned panels were noted and are reported in Table 3 below.

The data for the fresh bath tests show that all the formulations remove 100% of the paint in 10 to 16.5 minutes and produced stripped panels which were free of stain.

The data for the aged bath tests show that formulation 11 containing $R'O(CH_2CH_2O)_n$ as the activator and formulations 1, 2, 3, 6 and 7 containing both $R'O(CH_2CH_2O)_n$ and $R'O(CH_2CH_2O)_n$ as the activator produced stripped panels with only a light strain (except formulation 3 which produced a moderate stain).

The formulations 8, 9 and 10 which contain both $R'O(CH_2CH_2O)_n$ and $R''O(CH_2CH_2O)_n$ and N-methyl-2-pyrrolidone as the activator and the formulations 12 and 13 which contain only N-methyl-2-pyrrolidone as the activator produced 100% stripped panels which were free of stain.

EXAMPLE 4

In order to further determine the cleaning efficiency of the activating formulations 1 to 13 of Examples 1 and 2, some of the formulations were used to strip Zn phosphate treated 1"×4" steel panels which had been spray painted with Sherwin Williams high solids solvent-based paint #4653 to provide an about 1.5 mils coating.

In using the activating compositions about 25% by volume of the formulation being tested was added to 40% by volume of a 45% potassium hydroxide solution and made up to 100% by volume with water.

The formulations were tested in an aged bath at a stripping bath temperature of 210° to 220° F. The aged bath tests were carried out using 100 ml samples of baths (containing 15 grams of the powdered paint) which had been boiled for 3 hours.

The test panels were checked after 10 minutes in the bath and after about 20 minutes (i.e. 20 to 23.5 minutes) in the bath and the amount of paint removed after 10 minutes and after about 20 minutes were noted and the appearances of the stripped panels after about 20 minutes were noted and are reported in Table 4 below.

TABLE 3

| Formulation | 1 | 2 | 3 | 6 | 7 | 8 | 9 | 10 | 11 | 12 | 13 |
|---|---|---|---|---|---|---|---|---|---|---|---|
| Fresh Bath | | | | | | | | | | | |
| Stripping Time to remove 100% of paint (min) | 12 | 13.5 | 15 | 13 | 13.5 | 10 | 10.5 | 11 | 16.5 | 15 | 10 |
| Appearance of Stripped Panels | 1+ | 1+ | 1+ | 1+ | 1+ | 1+ | 1+ | 1+ | 1+ | 1+ | 1+ |
| Aged Bath | | | | | | | | | | | |
| Stripping Time to remove 100% of paint (min) | 20 | 21.5 | 25.5 | 22 | 24.5 | 17.5 | 18 | 20 | 26 | 23 | 20 |
| Appearance of Stripped Panels | 2+ | 2+ | 3+ | 2+ | 2+ | 1+ | 1+ | 1+ | 2+ | 1+ | 1+ |

Appearance of the 100% stripped panels (degree of staining)
1+ = no stain
2+ = light stain
3+ = moderate stain
4+ = heavy stain

TABLE 4

| | Aged Bath | | | | | | | | |
|---|---|---|---|---|---|---|---|---|---|
| Formulation | 1 | 6 | 7 | 8 | 9 | 10 | 11 | 12 | 13 |
| Stripping Time | 10 | 10 | 10 | 10 | 10 | 10 | 10 | 10 | 10 |
| % paint removed | 50 | 40 | 35–45 | 50–60 | 50–60 | 50 | 30 | 40 | 50 |
| Stripping Time | 22.5 | 22 | 20 | 20 | 20 | 21 | 20 | 23.5 | 21 |
| % paint removed | 100 | 95 | 90 | 100 | 100 | 100 | 90 | 100 | 100 |
| Appearance of Stripped Panel | 2+ | 2+ | 2+ | 1+ | 1+ | 1+ | 2+ | 1+ | 1+ |

The data for the aged bath tests show that the formulation 11 containing $R'O(CH_2CH_2O)_n$ as the activator and formulations 1, 6 and 7 containing both $R'O(CH_2CH_2O)_n$ and $R''O(CH_2CH_2O)_n$ as the activator produced 90 to 100% stripped panels with only a light stain.

The formulations 8, 9 and 10 which contain both $R'O(CH_2CH_2O)_n$ and $R''O(CH_2CH_2O)_n$ and N-methyl-2-pyrrolidone as the activator and the formulations 12 and 13 which contain only N-methyl-2-pyrrolidone as the activator produced 100% stripped panels which were free of stain.

EXAMPLE 5

Additional formulations are prepared following the procedure of Example 4 formulations 8 and 9, with the exception that N-(2-hydroxy-ethyl)-2-pyrrolidone is substituted for the N-methyl-2-pyrrolidone; and formulation 13 with the exception that N-(2-hydroxy-ethyl)-2-pyrrolidone is substituted for the N-methyl-2-pyrrolidone.

While the present invention is particularly applicable to the removal or stripping of siccative coatings as defined above and described in the examples, it should be understood that the activator compositions of the invention may be employed in other applications. Such uses are not intended to be excluded by the description of the invention in connection with siccative coatings.

I claim:

1. An aqueous activating composition to be added to an aqueous alkaline solution for the removal of coatings or finishes at elevated temperatures consisting essentially of:
   A. At least one of the following activator constituents
      (i) An ethoxylated compound of the formula $R'O(CH_2CH_2O)_nH$ wherein R' is tetrahydrofurfuryl and n is about 0.5 to 10;
      (ii) A mixture of the ethoxylated compound of the formula $R'O(CH_2CH_2O)_nH$ wherein R' is tetrahydrofurfuryl and n is about 0.5 to about 10 and an ethoxylated compound of the formula $R''O(CH_2CH_2O)_nH$ wherein R'' is furfuryl and n is about 0.5 to about 10;
      wherein each of the activators is present in an amount of from about 0.1 to 20% by weight of the composition; and
   B. At least one of the following accelerator constituents
      (i) Furfurylamine, optionally in combination with N-phenyl-diethanolamine;
      (ii) Tetrahydrofurfurylamine, optionally in combination with N-phenyl-diethanolamine;
      wherein each of the accelerators is present in an amount from about 0.1 to 20% by weight of the composition; said constituents A and B being present in an amount sufficient to activate the aqueous alkaline solution when added to the solution.

2. An activating composition according to claim 1 comprising at least one of a sequestering agent, a surfactant, a stabilizing agent and a coupling agent, wherein said sequestering agent is present in an amount of from about 0.1 to 20% by weight of the composition and said surfactant, stabilizing agents, and coupling agent are each present in an amount of from about 0.1 to 10% by weight of the composition.

3. An activating composition according to claim 1 wherein component A comprises 3 to 15% by weight, and component B comprises 2 to 15% by weight of the composition.

4. An activating composition according to claim 1 wherein in the component A $R'O(CH_2CH_2)_nH$ compound n is about 3 to 8.

5. An activating composition according to claim 1 wherein in the component A $R'O(CH_2CH_2O)_nH$ compound n is about 0.5 to 1.5.

6. An activating composition according to claim 1 wherein Component A consists essentially of a mixture of $R'O(CH_2CH_2O)_nH$ wherein R' is tetrahydrofurfuryl and n is about 3 to 8, and $R''O(CH_2CH_2O)_nH$ wherein R'' is furfuryl and n is about 0.5 to 1.5.

7. An activating composition according to claim 6 wherein Component B consists essentially of N-phenyl-diethanolamine in an amount of about 4 to 8% by weight.

8. An activating composition according to claim 6 wherein component A consists essentially of a mixture of compound
   $R'O(CH_2CH_2O)_nH$ in an amount of about 3 to 10% by weight, and compound
   $R''O(CH_2CH_2O)_nH$ in an amount of about 3 to 12% by weight.

9. An activating composition according to claim 1 wherein component A consists essentially of compound
   $R'O(CH_2CH_2O)_nH$ in an amount of about 15% by weight.

10. An activating composition according to claim 2 wherein the sequestering agent comprises a hydroxycarboxylic acid.

11. An activating composition according to claim 2 wherein the stabilizing agent comprises tetraethylene glycol.

12. An activating composition according to claim 2 comprising a coupling agent which is the monobutyl ether of diethylene glycol in an amount of about 0.1 to 10% by weight.

13. An activating composition according to claim 1 wherein component A consists essentially of
    a mixture of $R'O(CH_2CH_2O)_nH$ wherein R' is tetrahydrofurfuryl and
    n is about 3 to 8; and $R''O(CH_2CH_2O)_nH$ wherein R'' is furfuryl and n is about 0.5 to 1.5; and at least one of
N-methyl-2-pyrrolidone and
N-(2-hydroxyethyl)-2-pyrrolidone.

14. An activating composition according to claim 1 wherein component B consists essentially of at least one of
Furfurylamine
Tetrahydrofurfurylamine;
each in an amount of about 2 to 15% by weight.

15. An activating composition according to claim 14 wherein component B consists essentially of at least one of
Furfurylamine
in an amount of about 4 to 8% by weight, and
Tetrahydrofurfurylamine
in an amount of about 4 to 8% by weight.

16. An activating composition according to claim 15 comprising at least one of a sequestering agent, a surfactant and a stabilizing agent wherein said sequestering agent is present in an amount of from about 0.1 to 20% by weight of the composition and said surfactant and stabilizing agents are each present in an amount of from about 0.1 to 10% by weight of the composition.

17. An activating composition according to claim 16 wherein the sequestering agent comprises a hydroxycarboxylic acid in an amount of about 2 to 10% by weight.

18. An activating composition according to claim 16 wherein the surfactant comprises sodium butoxyethoxy acetate in an amount of about 1 to 5% by weight.

19. An activating composition according to claim 16 wherein the stabilizing agent comprises at least one of thiodiethylene glycol in an amount of about 2 to 12% by weight and tetraethylene glycol in an amount of about 2 to 12% by weight.

20. An aqueous alkaline solution for removing a siccative coating from a substrate coated therewith at an elevated temperature comprising
  I about 2 to about 5 volumes of the composition of claim 1, and
  II about 10 volumes of an aqueous alkaline solution containing from about 10 to about 50% by weight of an alkali metal hydroxide.

21. An activating composition according to claim 20, wherein the alkali metal hydroxide is sodium hydroxide, potassium hydroxide or mixtures thereof and the concentration of the alkali metal hydroxide is about 45 to 50% by weight.

22. A method of removing a siccative coating from a substrate coated therewith comprising the steps of
  (1) contacting said coated substrate with an effective quantity of the composition of claim 6 at an elevated temperature until the siccative coating is removed from the coated substrate; and
  (2) removing the substrate from contact with the composition.

23. A method of removing a siccative coating from a substrate coated therewith comprising the steps of
  (1) contacting said coated substrate with an effective quantity of the composition of claim 13 at an elevated temperature until the siccative coating is removed from the coated substrate; and
  (2) removing the substrate from contact with the composition.

* * * * *

UNITED STATES PATENT AND TRADEMARK OFFICE
CERTIFICATE OF CORRECTION

PATENT NO.   : 4,737,195
DATED        : April 12, 1988
INVENTOR(S)  : Carmen M. Carandang; Robert W. Koch It is certified that error appears in the above-identified patent and that said Letters Patent is hereby corrected as shown below:

At Column 12, line 10, in claim 4, delete the formula
"R'O(CH$_2$CH$_2$)$_n$H"
and insert the formula
--R'O(CH$_2$CH$_2$$\underline{O}$)$_n$H--

Signed and Sealed this

Seventeenth Day of March, 1992

Attest:

HARRY F. MANBECK, JR.

*Attesting Officer*       *Commissioner of Patents and Trademarks*